United States Patent [19]

Murakami et al.

[11] Patent Number: 4,462,025
[45] Date of Patent: Jul. 24, 1984

[54] INDICATION DEVICE FOR CAMERA

[75] Inventors: Hiroyasu Murakami, Tokyo; Takashi Uchiyama, Kanagawa; Ryoichi Suzuki, Kanagawa; Masaharu Kawamura, Kanagawa; Shinji Sakai, Tokyo; Kikuo Momiyama, Kanagawa, all of Japan

[73] Assignee: Canon Kabushiki Kaisha, Japan

[21] Appl. No.: 185,159

[22] Filed: Sep. 8, 1980

[30] Foreign Application Priority Data

Sep. 6, 1979 [JP] Japan .................. 54-114420

[51] Int. Cl.³ .............................. G09G 3/36
[52] U.S. Cl. .................. 340/753; 340/718; 340/784; 354/289
[58] Field of Search ............... 340/718, 719, 765, 748, 340/753, 754, , 784; 354/289

[56] References Cited

U.S. PATENT DOCUMENTS

| 3,740,717 | 6/1973 | Huener | 340/784 |
| 3,751,137 | 8/1973 | Fitzgibbons et al. | 340/718 |
| 4,114,070 | 9/1978 | Asars | 340/718 |
| 4,239,346 | 12/1980 | Lloyd | 340/719 |
| 4,250,503 | 2/1981 | Shanks | 340/784 |
| 4,253,096 | 2/1981 | Kmetz | 340/753 |
| 4,290,686 | 9/1981 | Suzuki et al. | 354/289 |
| 4,299,462 | 11/1981 | Suzuki et al. | 354/289 |
| 4,302,086 | 11/1981 | Suzuki et al. | 354/289 |

Primary Examiner—Marshall M. Curtis
Attorney, Agent, or Firm—Toren, McGeady and Stanger

[57] ABSTRACT

A camera includes a viewfinder with an indicator having two opposing substrates sandwiching a liquid crystal between them. One substrate includes a common electrode arrangement with a plurality of electrodes. The other substrate includes a segmented electrode arrangement with a number of electrodes facing the respective electrodes of the common electrode arrangement. Short-circuit connectors connect predetermined electrodes in the segmented electrode arrangement. A first contactor has a number of conductors connected to the respective electrodes of the segmented electrode arrangement to deliver predetermined drive signals thereto. At least one of the short-circuiting connectors is arranged at the input portion of the first contactor. A second contactor with a number of conductors is connected to respective electrodes of the common electrode arrangement so as to deliver predetermined drive signals thereto.

5 Claims, 27 Drawing Figures

FIG. 1
(PRIOR ART)
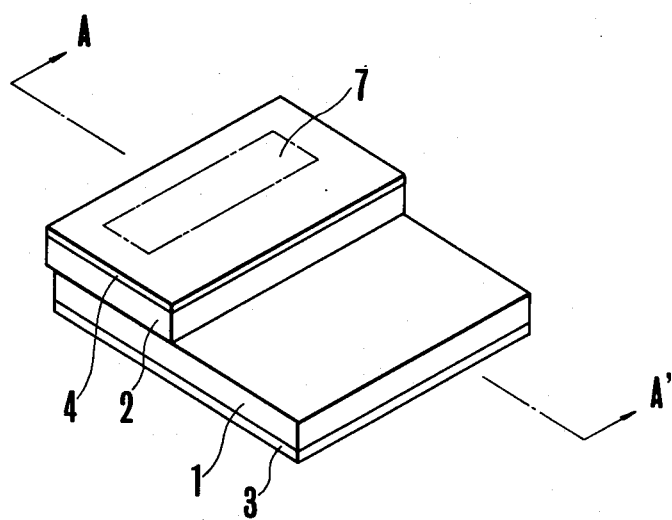
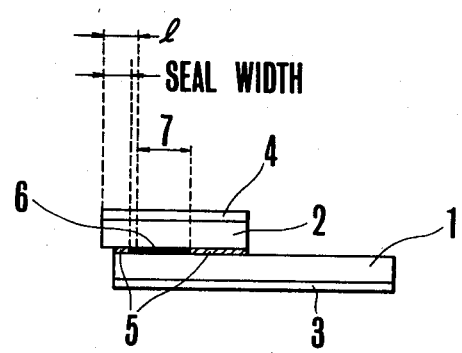
AA' SECTION

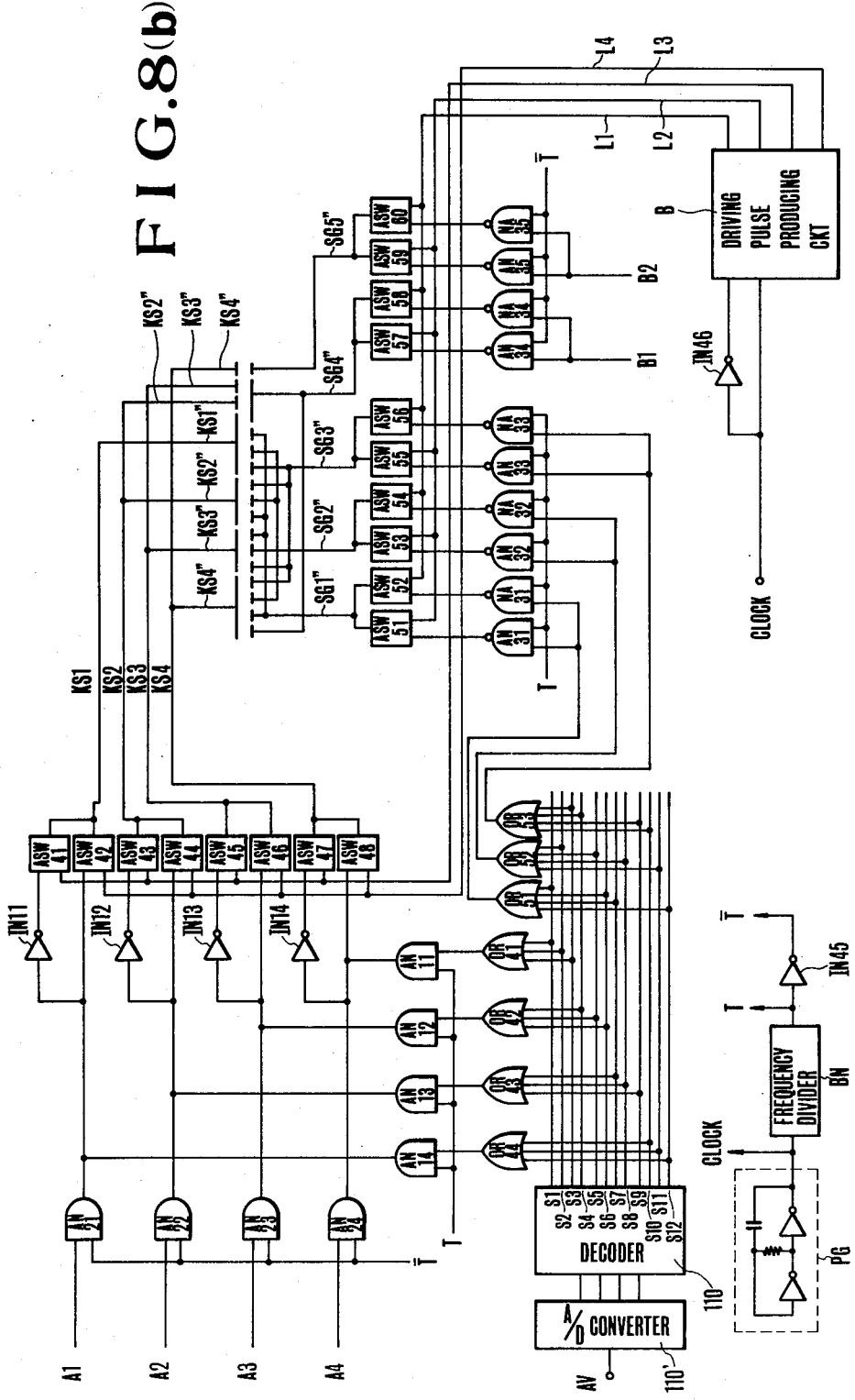

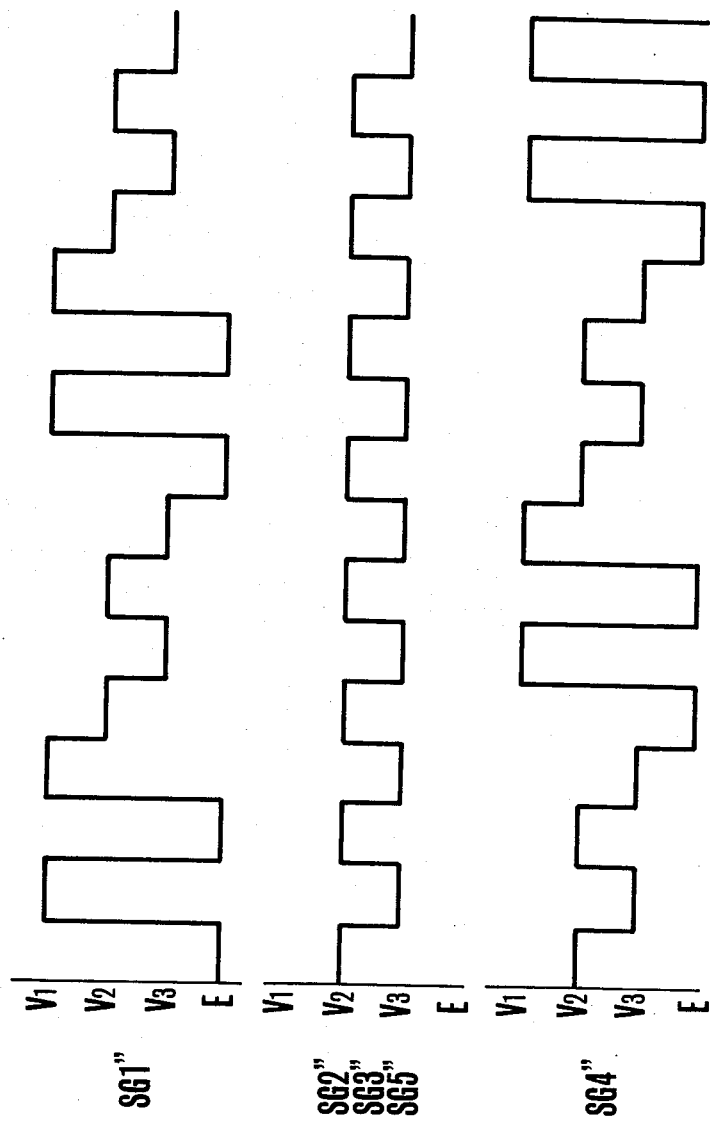

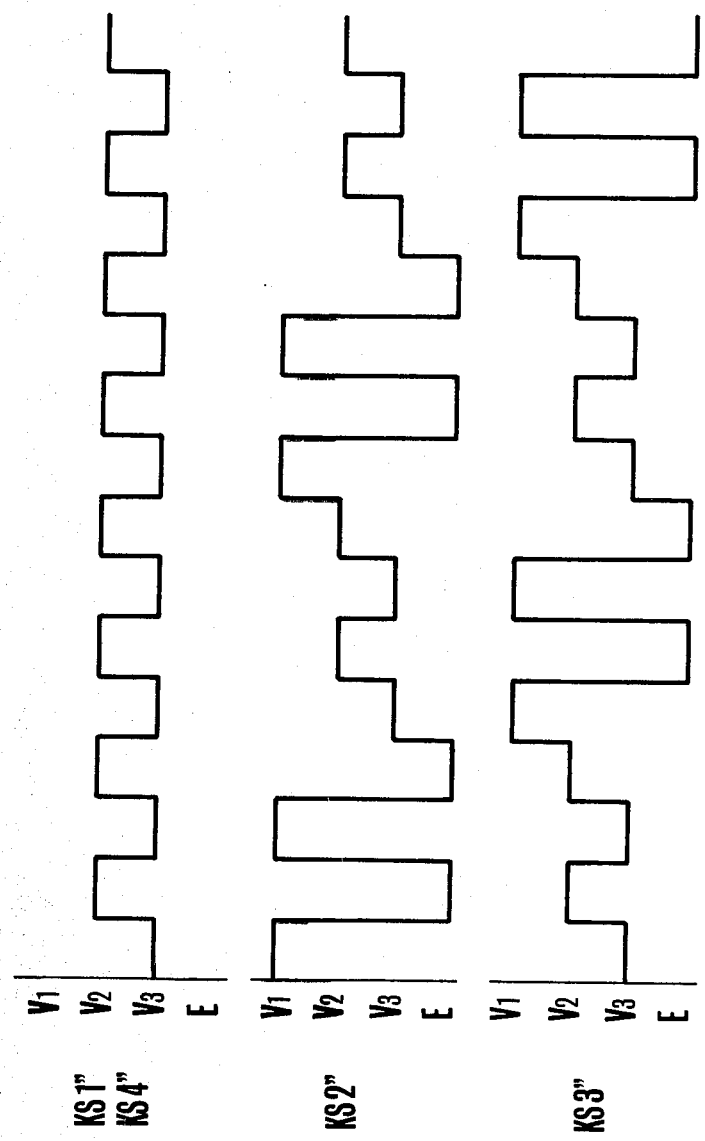

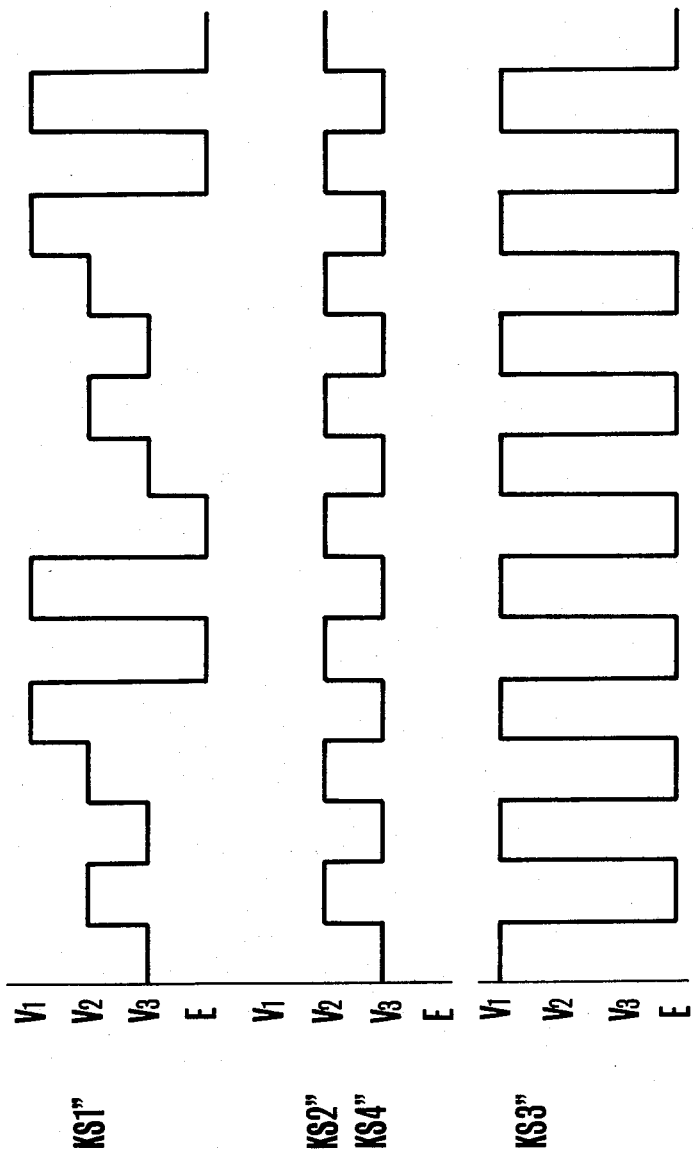

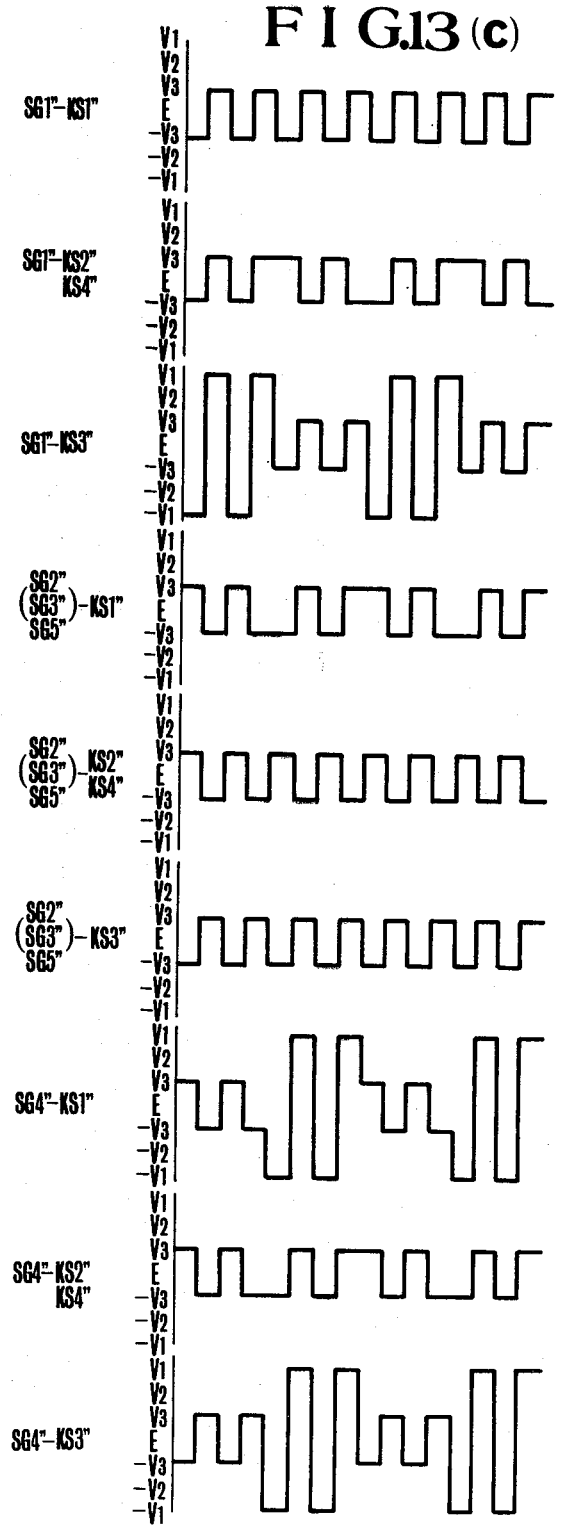

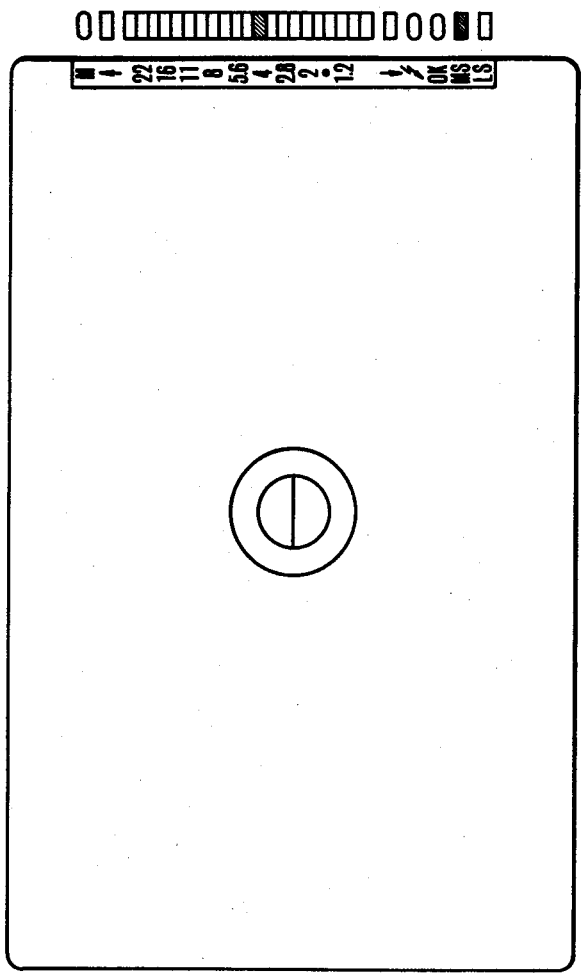

INDICATION DEVICE FOR CAMERA

BACKGROUND OF THE INVENTION

1. Field of the Invention

This invention relates to cameras, and particular, to camera viewfinders, and most particularly, to an indicating device for indicating photographic data and the like in a viewfinder, especially a liquid crystal indicating device arranged along the view field frame of the viewfinder.

2. Description of the Prior Art

Quite recently, meter indications in the viewfinder of a camera, particularly single lens reflex cameras, have utilized LED displays. However, an LED (light emitting diode), which is a light emitting body consumes a considerable amount of electric power. Hence, digital indications or the like using many LEDs consume comparatively large amounts of electricity. Therefore, the life of an LED loaded battery is short and renders the system inconvenient.

On the other hand, electrical indicators or displays using liquid crystals or the like are not concerned with active light emitting devices, but are passive. Hence, they consume little electric power. For this reason, liquid crystal displays are suitable for a device to be driven by small capacity power sources, such as are used in a camera. Thus, considerable consideration has been given to liquid crystal displays for cameras. However, a problem exists in the use of such liquid crystal displays.

The problem is best explained by referring to FIG. 1 which shows an example of an indicating device using a liquid crystal. In the drawing, glass base plates 1 and 2 having transparent electrode patterns carry polarization plates 3 and 4. A width of 10µ separates the base plates, between which the liquid crystal 6 is located and sealed by means of the seal 5. At the same time, the seal 5 serves as a spacer across which the electrodes 1 and 2 face each other. On an indication portion 7, one produces indication by applying a voltage between the electrodes 1 and 2. The space between the end plane of the glass base plate and the liquid crystal material is the seal width. From the view point of fidelity in securing the base plates, it is necessary that the seal portion should have a certain width. On the other hand, the seal portion includes the glass end plane and not the indication portion. Hence, necessarily, light is shaded from the indication portion. However, due to this light shading portion, the liquid crystal indication portion is spaced from the edge of the view field frame in such a manner that the indication in the view field is hard to observe. This is inconvenient.

SUMMARY OF THE INVENTION

An object of the present invention is to solve the above problems so as to offer a most suitable indication device.

Another object of the present invention is to offer a liquid crystal indication device for a camera with a small space l between the end plane of the glass and the indication portion.

BRIEF DESRIPTION OF THE DRAWINGS

FIG. 1 shows the conventional indication device in which the liquid crystal is used in perspective view and in section.

Figure 2:
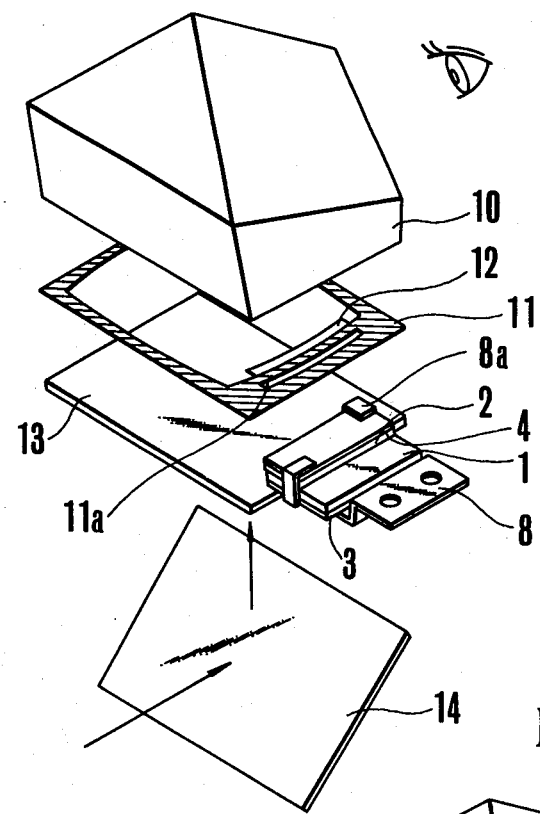
FIG. 2 shows an example of the arrangement of the view finder optics of the camera system in accordance with the present invention in disassembled perspective view.
Figure 8A:
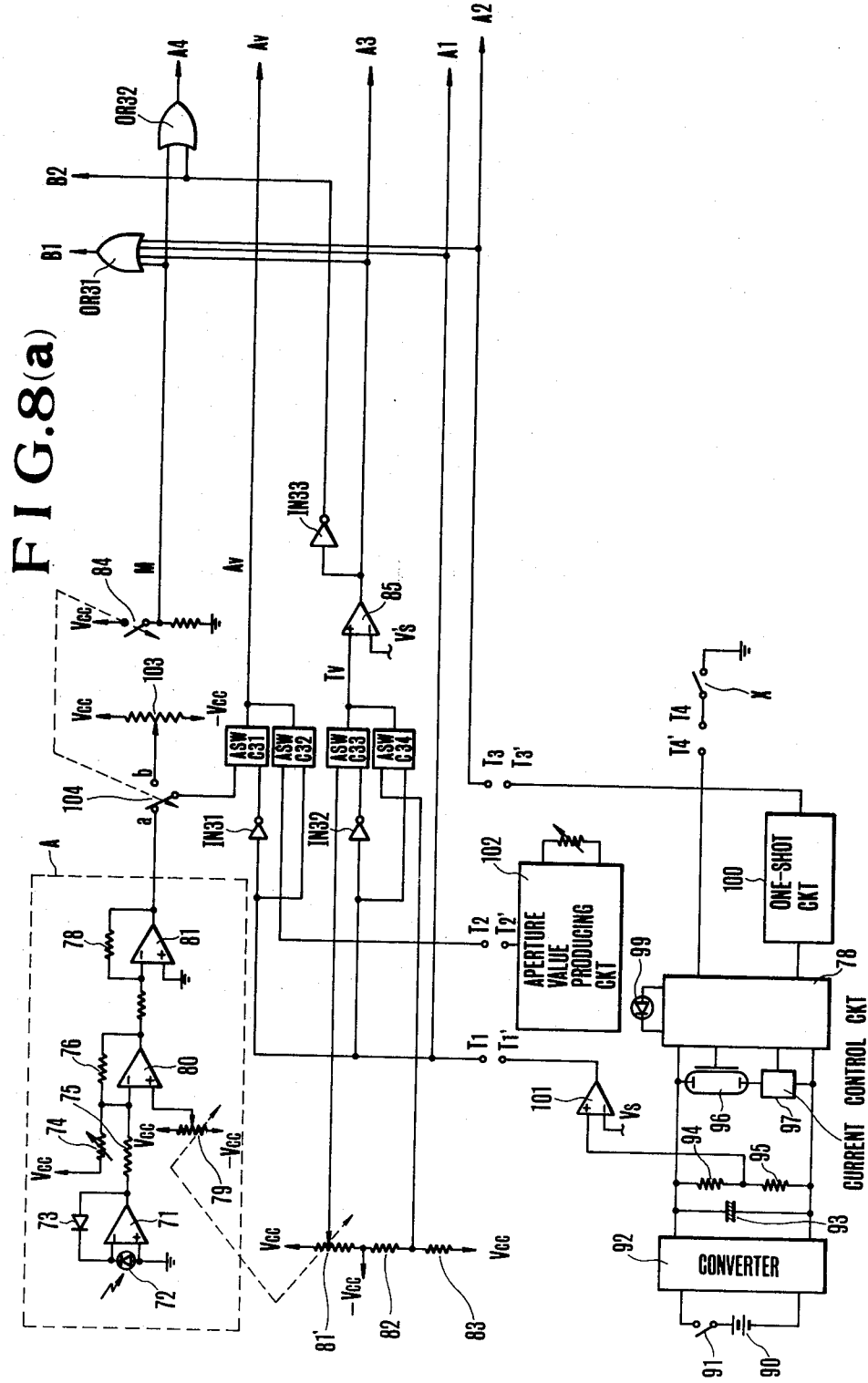

FIGS. 8(a) and 8(b) show an embodiment of the driving circuit for the liquid crystal indication device of the camera system shown in FIG. 2.

Figure 9A:
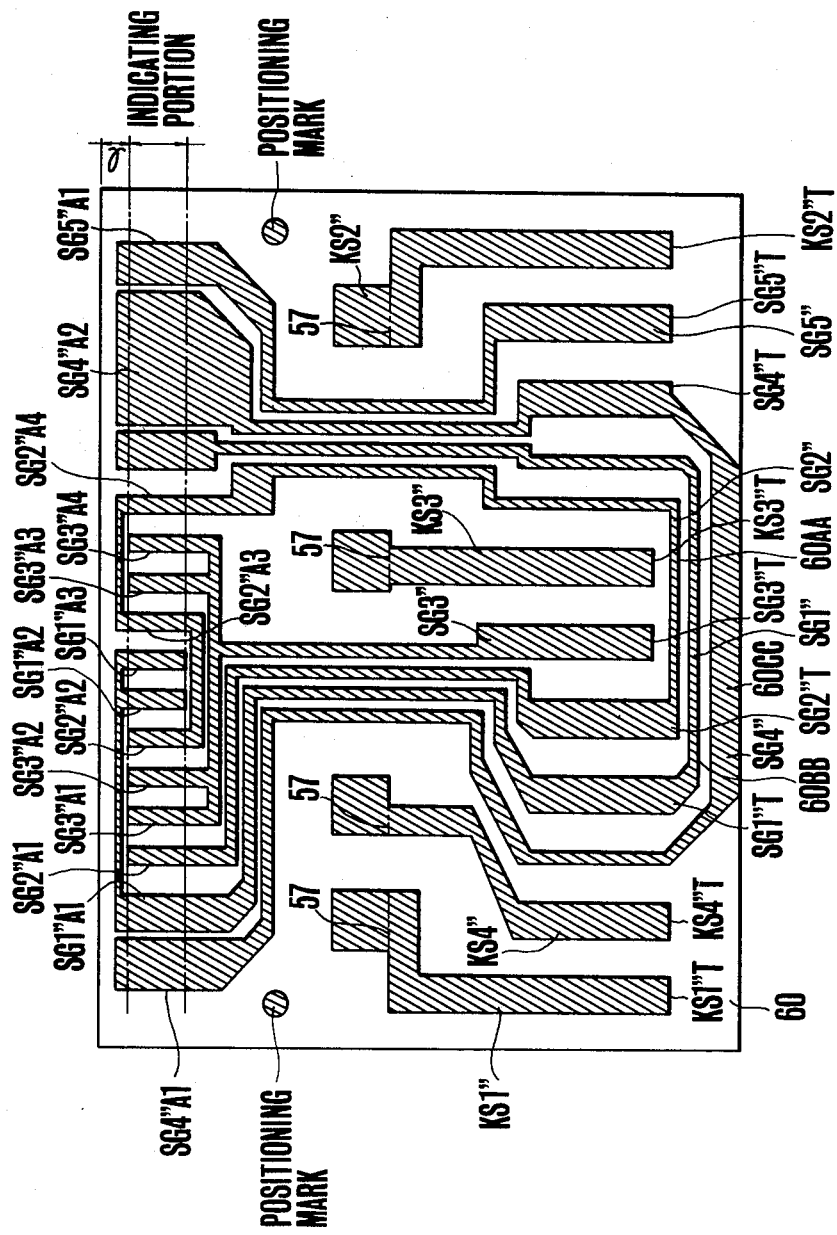

FIGS. 9(a) and 9(b) show the patterns of the upper and the lower electrode base plate of the liquid crystal indication device of the camera system shown in FIG. 2.

Figure 10:
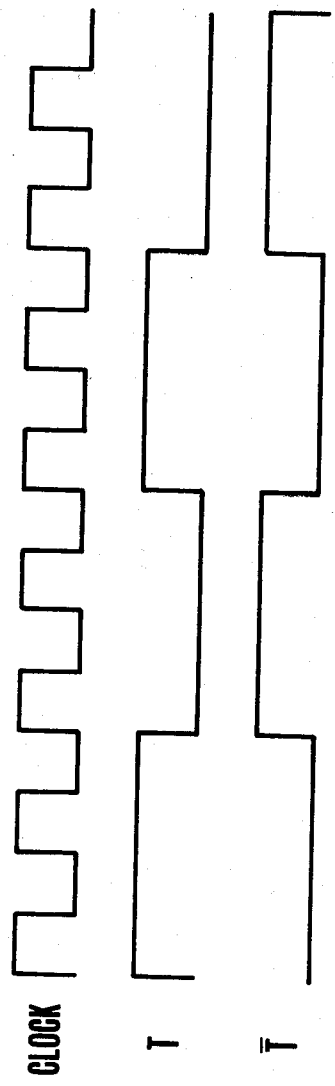

FIG. 10 shows the wave forms of the pulses at various portions of the circuit shown in FIG. 8.

Figure 9:
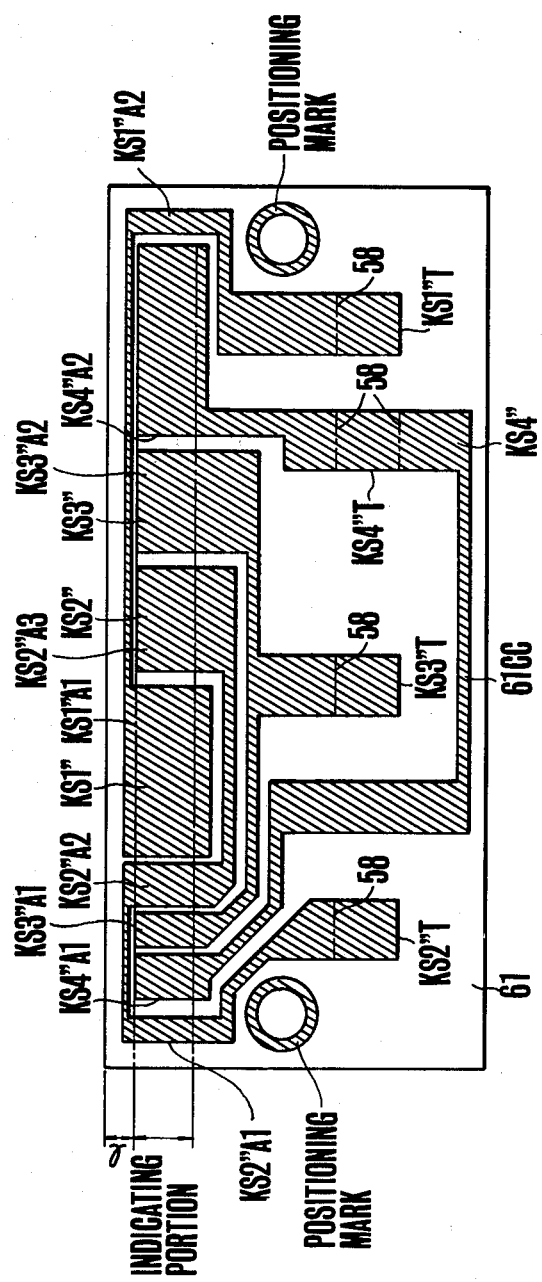
Figure 11:
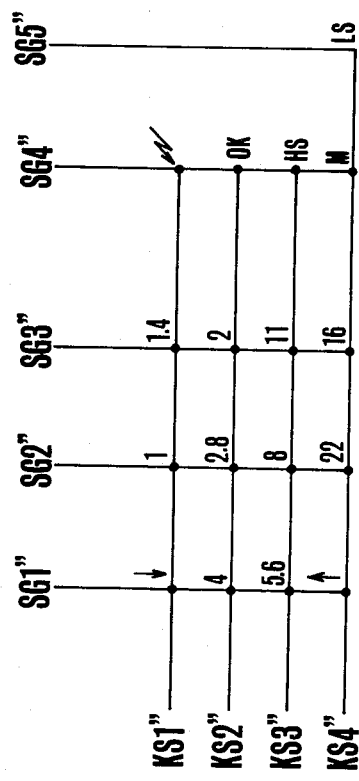

FIG. 11 shows the patterns of the indication device shown in FIG. 9 in shape of matrix.

Figure 12:
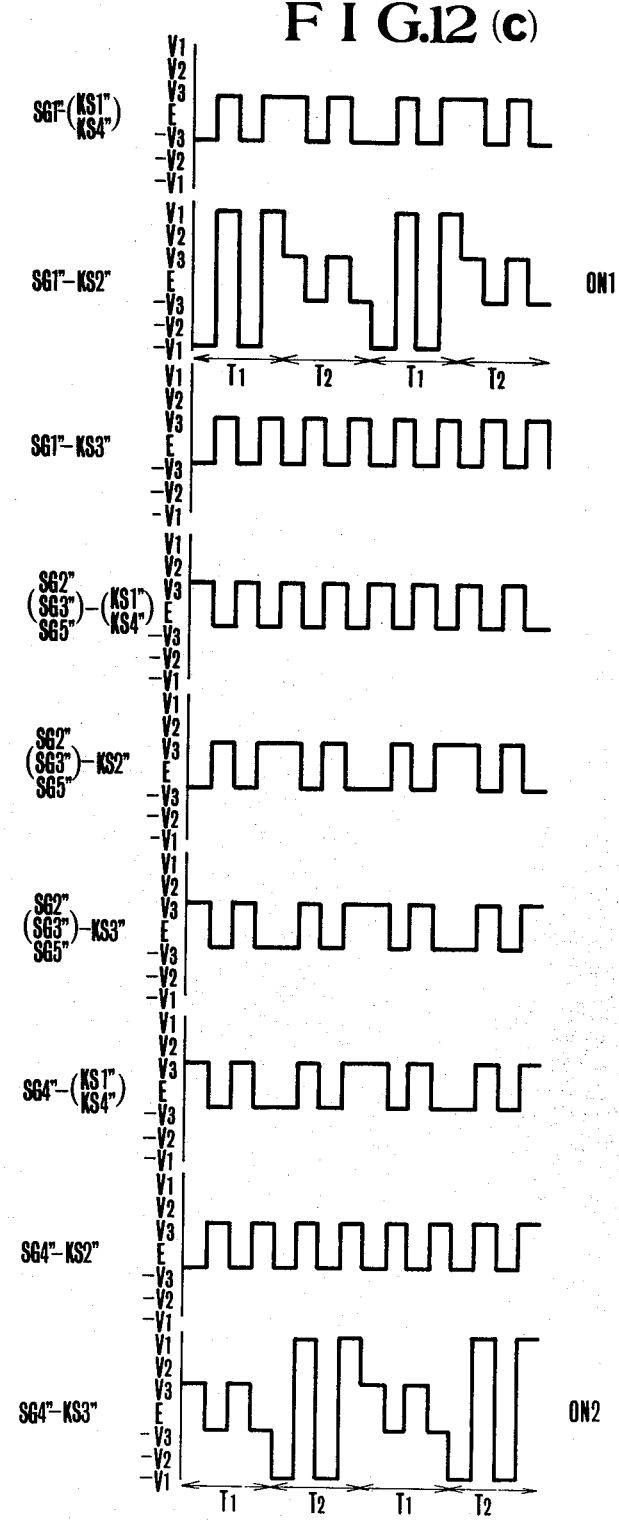

FIGS. 12(a), (b) and (c) respectively show the wave forms of the pulses at the respective electrodes of the indication portion of the circuit shown in FIG. 8.

Figure 13A:
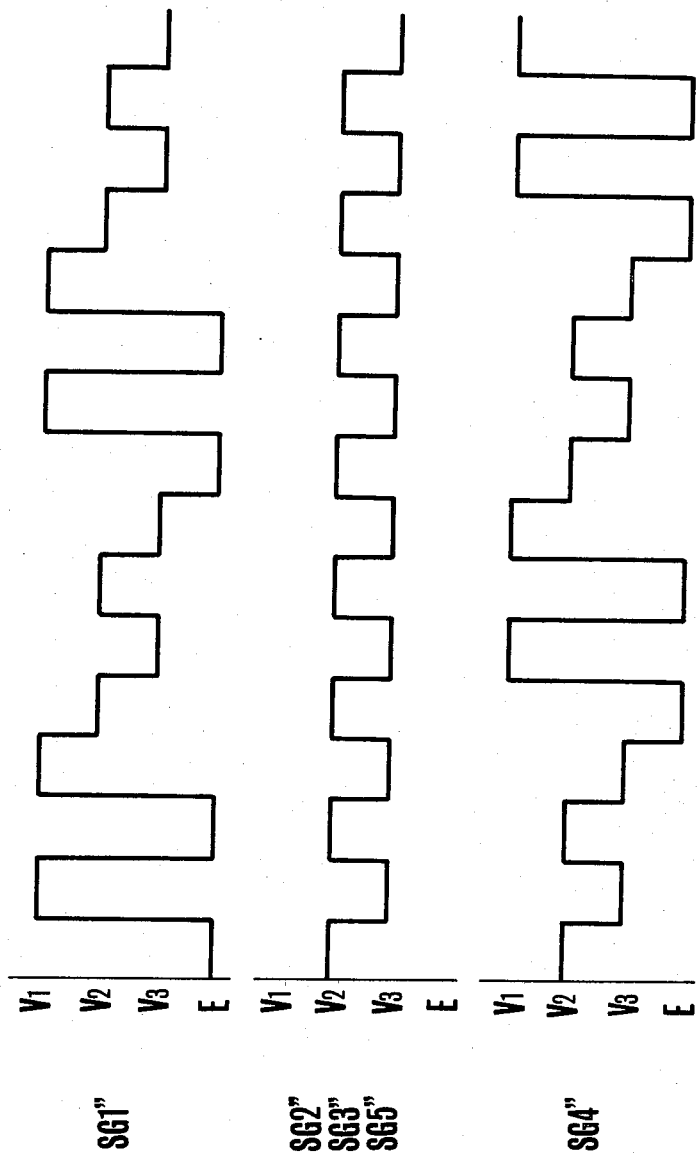

FIGS. 13(a), (b) and (c) show the wave forms of the pulses at the respective electrodes of the indication portion of the circuit shown in FIG. 8, when the speed light device has been charged.

FIG. 14 shows the arrangement of the liquid crystal indication device in the view finder of the camera system shown in FIG. 2.

Figure 15:
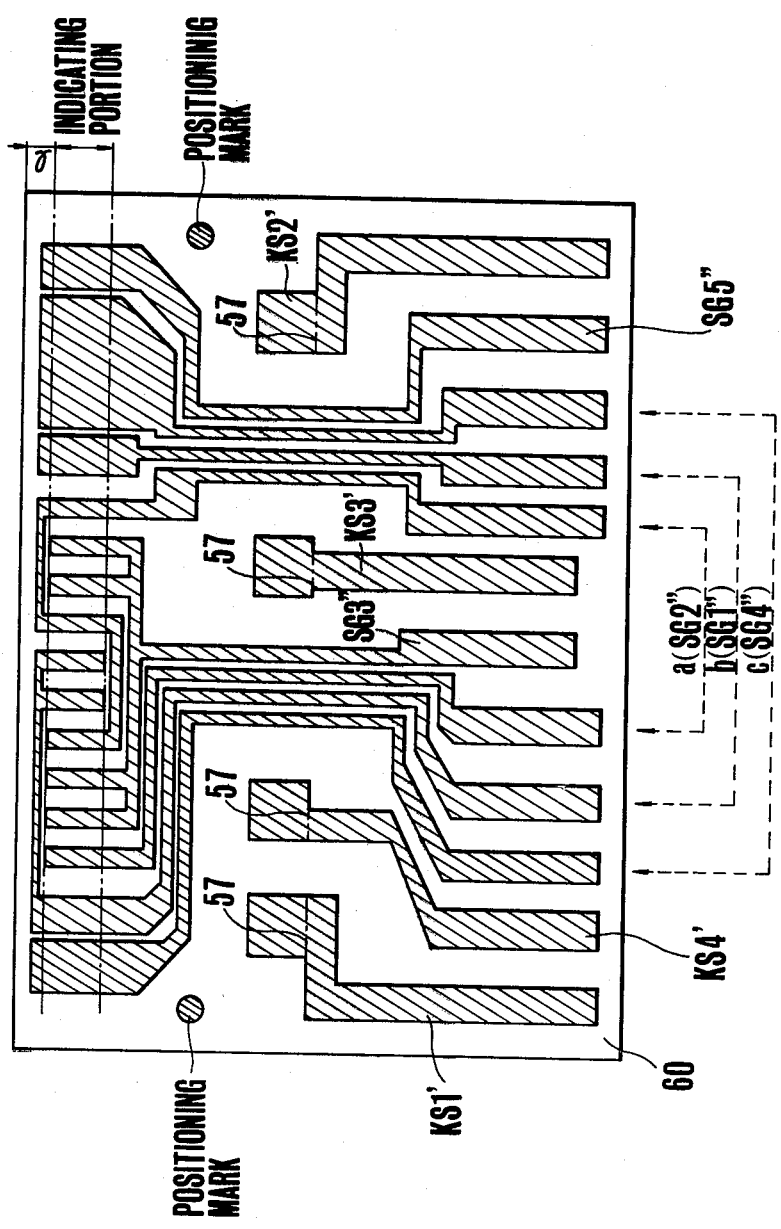

FIG. 15 shows the patterns of the one electrode base plate as another embodiment of the indication device of the present invention.

Figure 16:
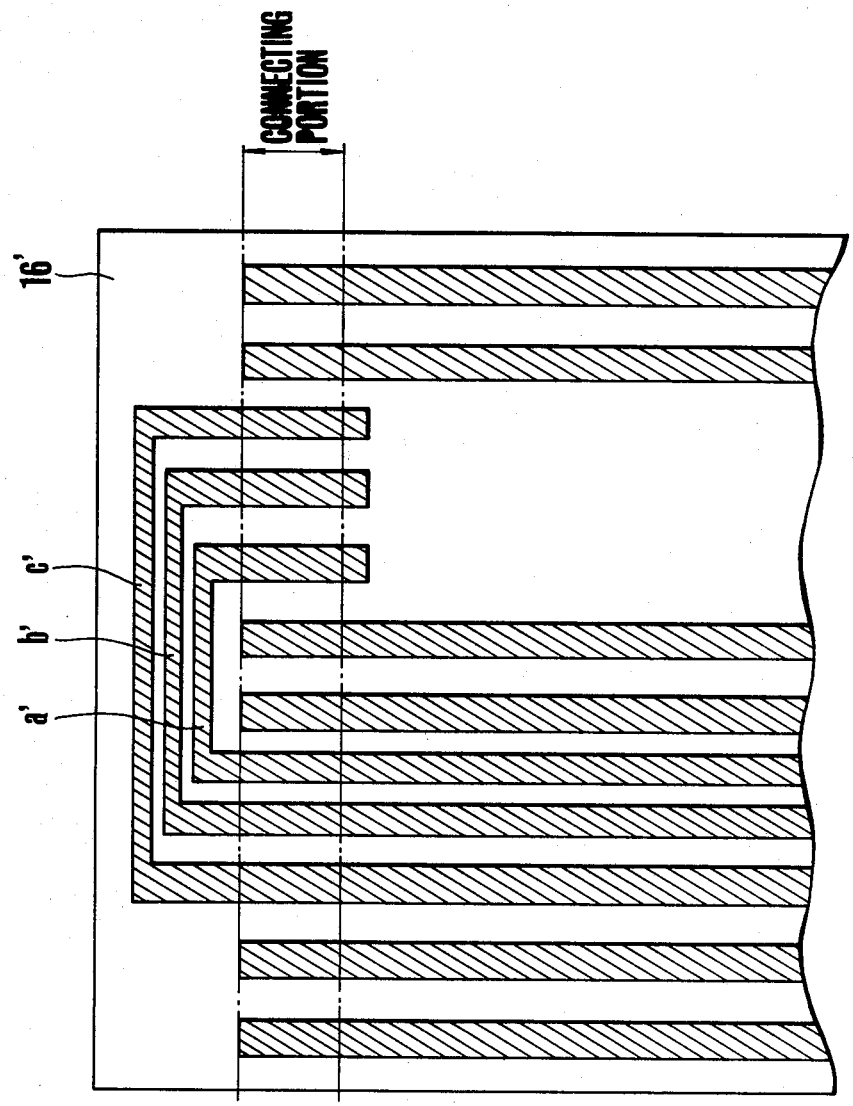
Figure 17:
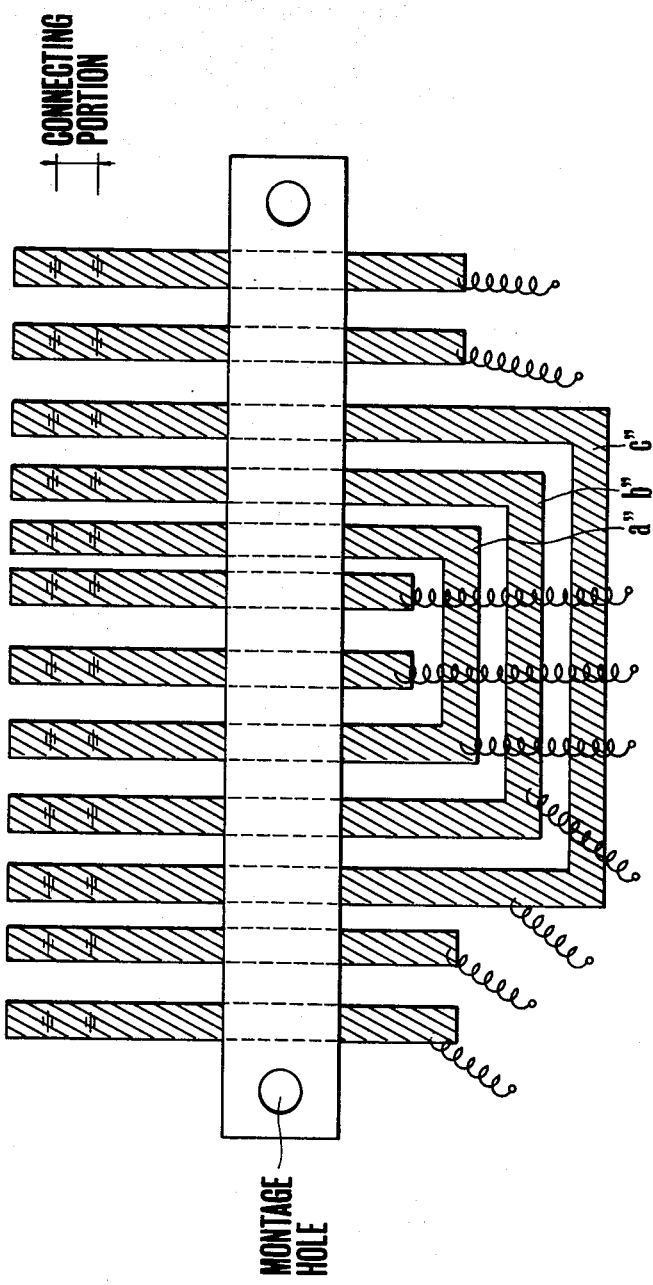

FIGS. 16 and 17 show the patterns of the printed circuit plate and the connecting base plate having the connecting portion patterns to be used in combination with the electrode base plate shown in FIG. 15.

FIGS. 18(a) and 18(b) show the patterns of the electrode base plate as the third embodiment of the indication device of the present invention and the important part in section.

Figure 19A:
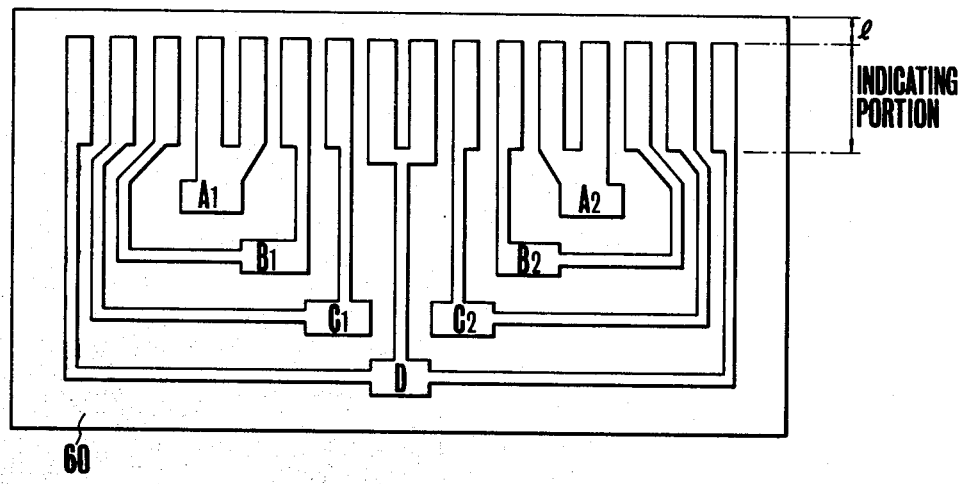
Figure 19B:
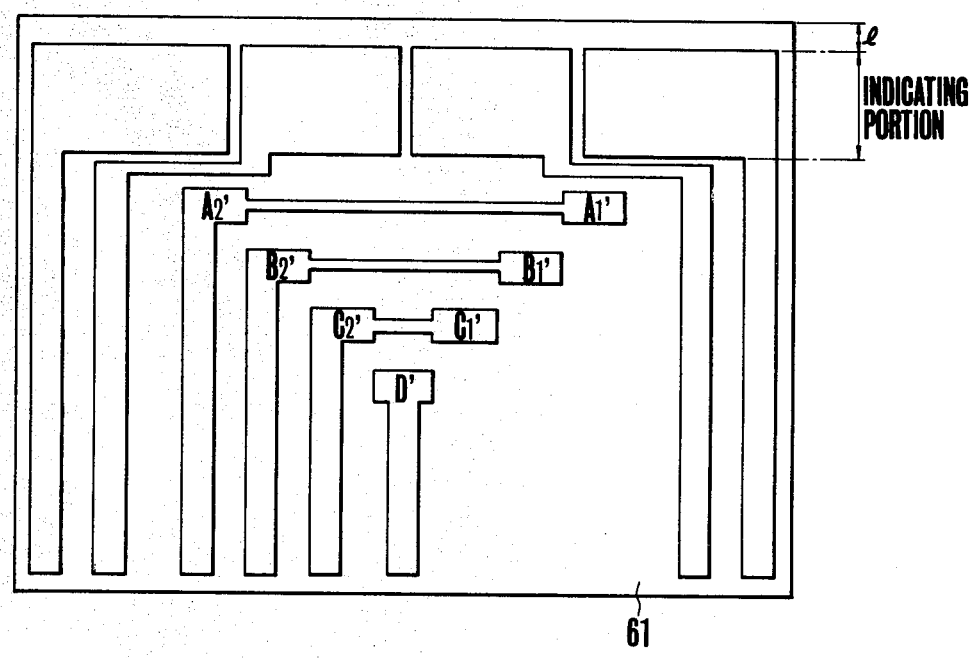

FIGS. 19(a) and 19(b) show the patterns of the upper and the lower electrode plates as the fourth embodiment of the indication device of the present invention.

DESCRIPTION OF THE PREFERRED EMBODIMENTS

Below the present invention will be explained in detail in accordance with the accompanying drawings of the embodiments of the present invention.

FIG. 2 shows an arrangement of view finder optics (i.e. optical arrangement) for the camera system in accordance with a present invention. In the drawing, the members 1-4 are the same ones as those in FIG. 1, while member 8 is the fixing member of the liquid crystal device, being secured (cemented at the portion not shown in the drawing) with 8a as fixing standard and further to the pentagonal prism holder not shown in the drawing by means of screws. Member 10 is a pentagonal prism and member 11 is a view field mask. In order to compensate for the distortion of the view field, the frame of the view field has light shading boundaries which almost correspond to the arcs of a circle having a center on a line passing through the center of the photographic view field and parallel to the long or the short sides of the view field in such a manner that the boundaries might appear as straight lines when the photographer looks through the view finder. Further, the light-shading narrow curved strip-shaped portion between the boundary line of the view field and the liquid crystal indication window is intended to shade the end portion of the straight base plate of the liquid crystal indicating device and the seal portion. Further, in case the indication scale has a partial light shading effect, it is possible to carry out the light shading by means of the indication scale. An indication scale plate 12 is provided with the figures or the marks for the shutter times, or the aperture values or other photographic information and is cemented to the view field mask. In this way, the figures or the marks indicated can be recognized when the photographer looks through the view finder. Members 13 is a focusing plate, while member 14 is a quick return reflecting mirror.

Figure 3:
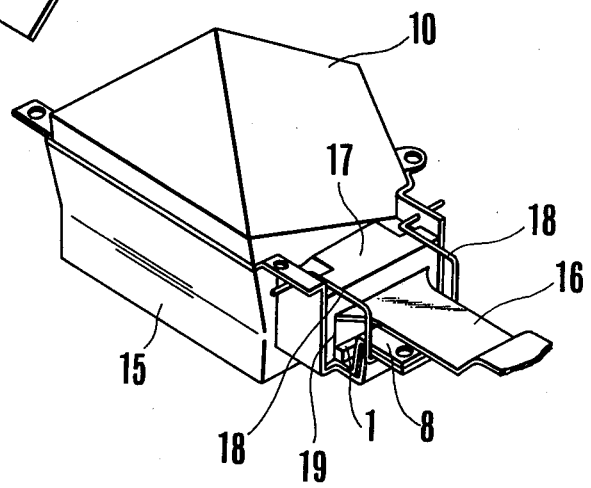
FIG. 3 shows the view finder portion, particularly the connecting portion to the circuit of the camera shown in FIG. 2 in perspective view.
Figure 4:
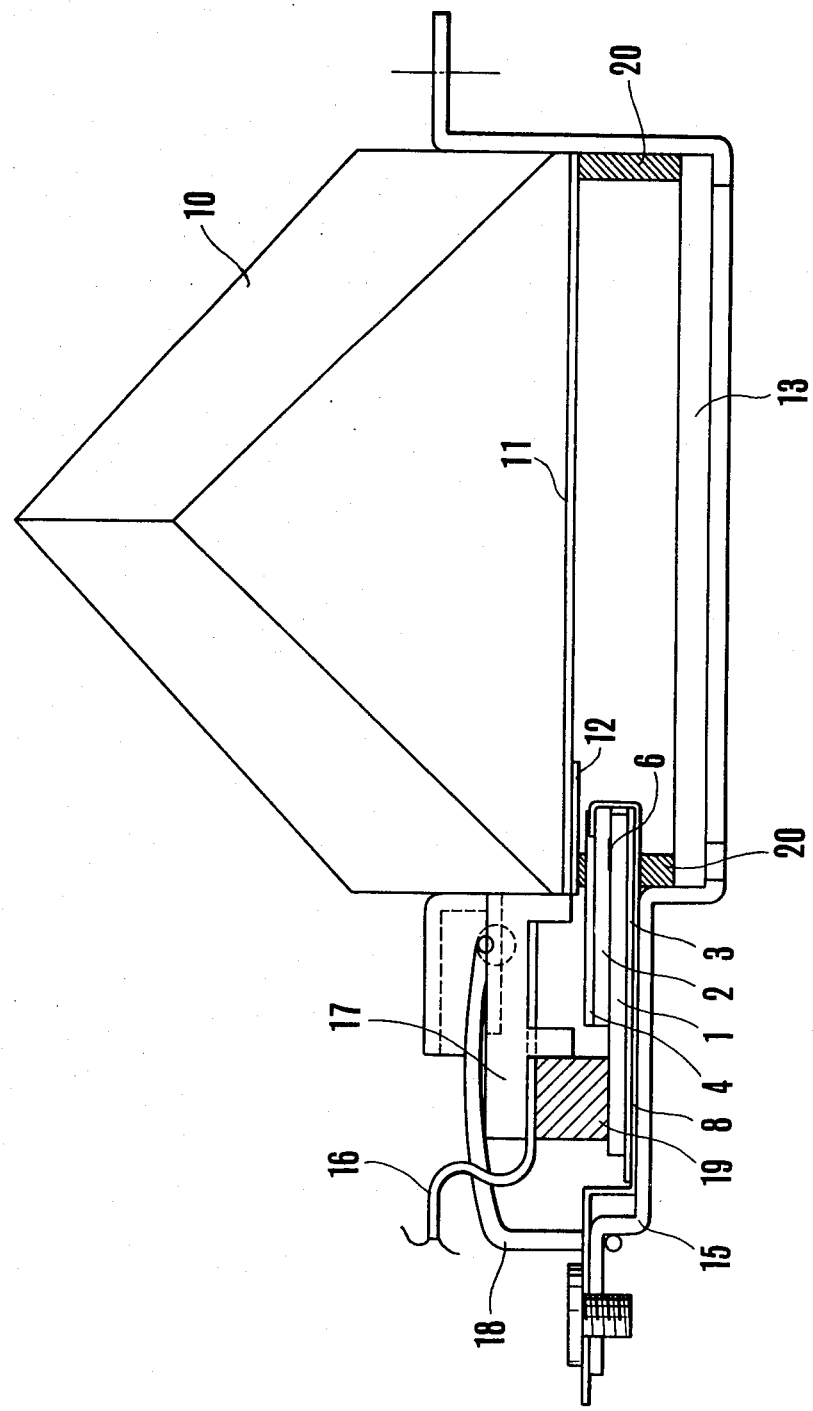
FIG. 4 shows the construction of the device shown in FIG. 3 in section.

FIG. 3 and FIG. 4 show the connection of the liquid crystal indicating device to a circuit (such as the decoder/driver, the light measurement control and the calculating circuit and so on which are conventional). The members 1-13 are the same ones as those in FIG. 2. A pentagonal prism holder 15 is secured on the camera body not shown in the drawing. A flexible printed wiring strip 16 serves as a connecting cable with the circuit not shown in the drawing. Member 17 is the damper for the connector rubber, serving to hold the connecting rubber 19 (being constructed in such a manner that the conductive portion and the non-conductive portion are unitary so as to suit to the pitch of the connector), by sandwiching it from the both sides and pressing it against the pentagonal prism holder and the pentagonal holder so as to prevent the entrance of dust and so on. (In order to improve the dust-proofing, it is sufficient to use silicone rubber or paste to seal the contact portion or the boundary portion of the pentagonal prism holder, the connector rubber damper, the pentagonal prism and so on.) A connector spring 18 is hung on the pentagonal prism holder and presses the above connector rubber 19 against the liquid crystal base plate so as to bring the flexible printed plate 16, the connector rubber 19 and the liquid crystal 1 into conductive connection with each other. member 20 is the spacer between the pentagonal prism and the focusing plate. (The indicating portion is cut open.)

Figure 5:
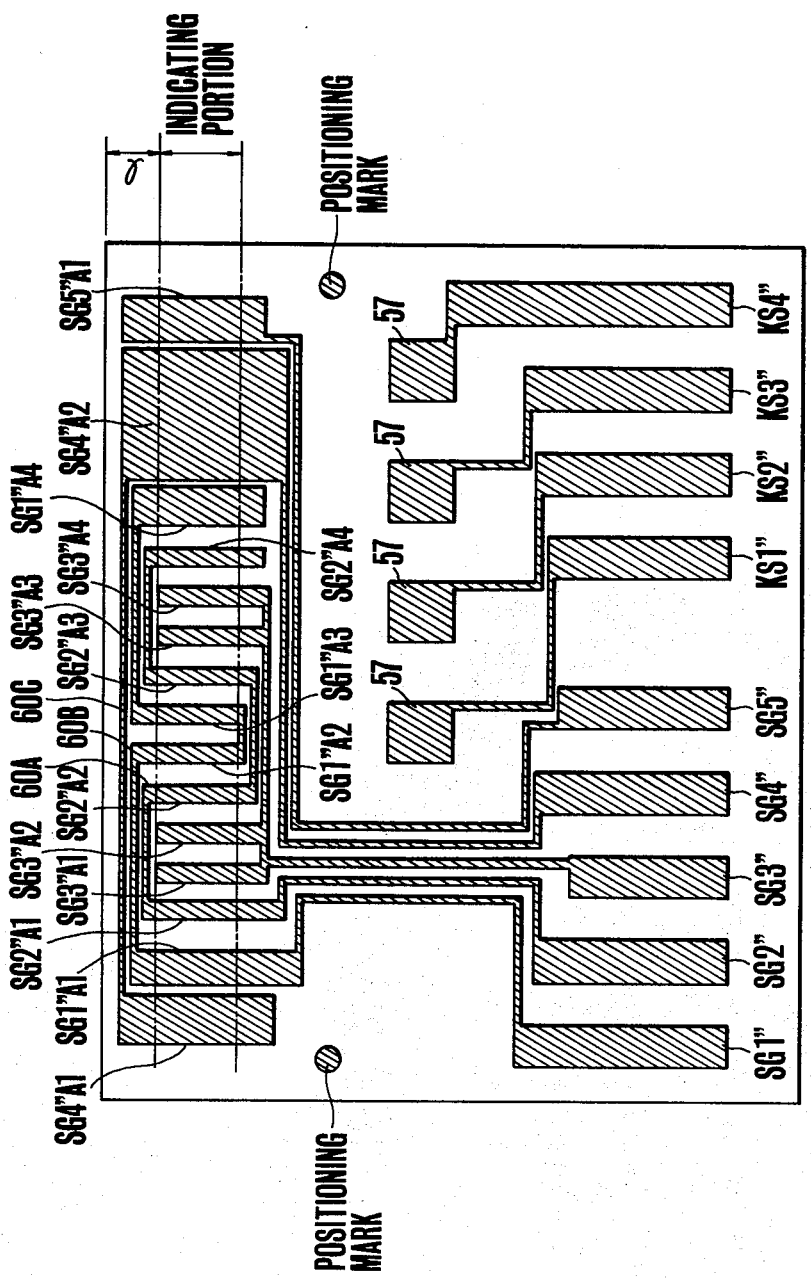
FIGS. 5 and 6 show the patterns as example of the upper and the lower transparent electrode base plate of the conventional liquid crystal indication device.
Figure 6:
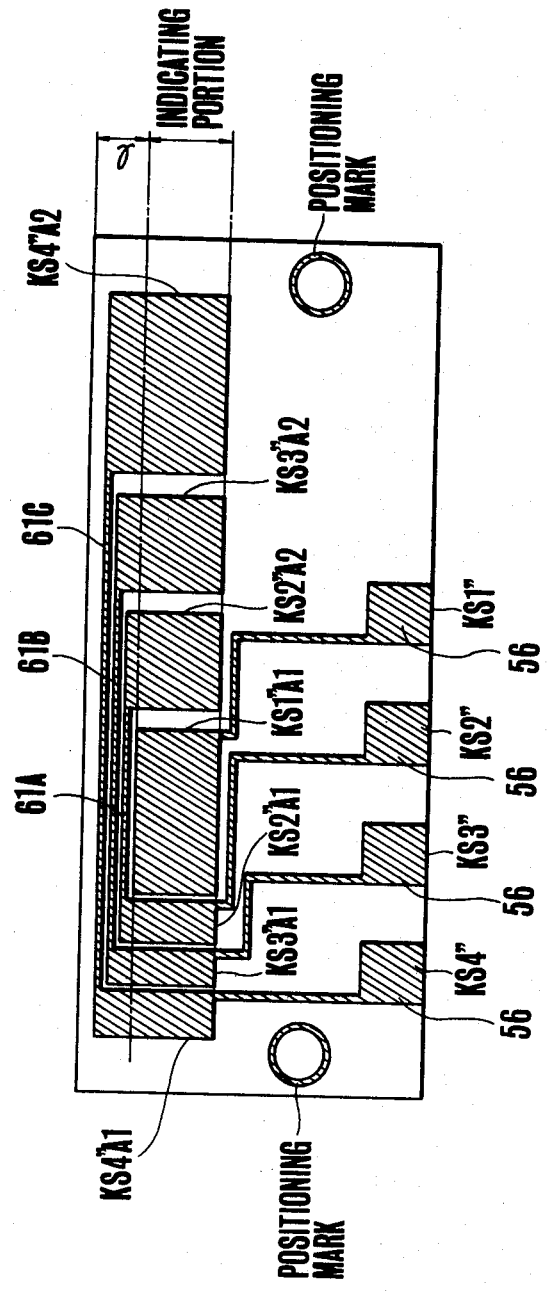
Figure 7:
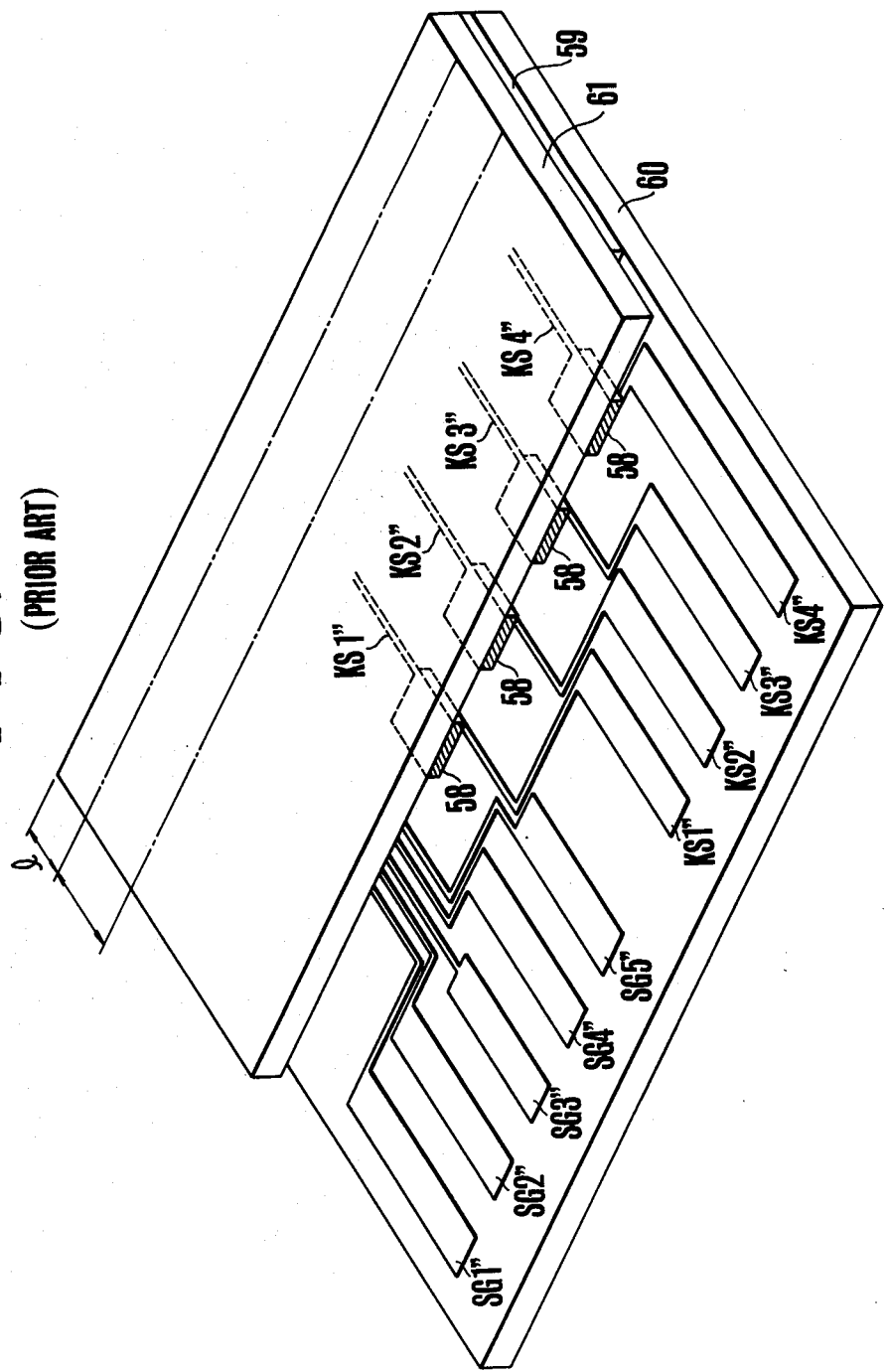
FIG. 7 shows the liquid crystal indication device consisting of the electrode base plates shown in FIGS. 5 and 6.

FIGS. 5 and 6 show the patterns on the glass plates when a liquid crystal is actually used in an indicating device in the view finder of the camera. These are the conventional patterns for realizing an indication matrix to be shown in FIG. 11. In this case, a conductive terminal 56 for the upper and the lower glass base plate is arranged at an end plane i.e., edge of the upper glass base plate so that as many as three connections 60A, 60B and 60C are provided in such a manner that the l is necessarily large in the space l between the indication portion and the glass end plane. FIG. 7 shows the construction of the liquid crystal cell assembled from the glass base plates whose patterns are shown in FIGS. 5 and 6, by making use of the positioning marks on the base plates. Here, elements 60 and 61 are transparent electrode base plates. Transparent segment electrodes SG1'' to SG5'' are formed on the transparent electrode base plates by metallization etc. so as to constitute a first signal electrode arrangement and transparent electrodes KS1''-KS4'' form a second signal electrode arrangement. The two transparent base plates are arranged so as to oppose each other as shown in the drawing. The liquid crystal matter is located in the space between the two base plates and sealed by means of spacers and the sealing member 59, while the electrodes KS1''-KS4'' on plate 60 and the electrodes KS1''-KS4'' on plate 61 are connected to each other through the conductive matter placed between them in such a manner that the liquid crystal cell is connected to the driving circuit only on the one side of the liquid crystal cell, namely only on the one plane of the transparent electrode base plate 60.

FIGS. 9(a) and 9(b) show the base plates and the patterns provided on the base plates of the liquid crystal indicating device to be used in the camera system shown in FIG. 2. Here, the electrodes (60AA, 60BB, 60CC) provided on the lower base plate (see FIG. 9(a)) form short-circuit connections which are arranged at the input part KS1''T-KS4''T, SG1''T-SG5''T of the signal electrodes KS1''-KS4'', SG1''-SG5''. The electrode (61CC) provided on the upper base plate (see FIG. 9(b)) forms a short-circuit connection which is arranged at the input section KS1''T-KS4''T of the signal electrodes KS1''-KS4''. Consequently, the space l between the indicating portion and the end plane of the base plate becomes small and, therefore, the liquid crystal indicating portion is closer to the indicating scale portion in such a manner that it becomes easier to observe the indicated contents.

Hereby, SG1''A1, SG1''A2, SG1''A3, SG2''A1, SG2''A2, SG2''A3, SG2''A4, SG3''A1, SG3''A2, SG3''A3, SG3''A4, SG4''A1, SG4''A2, and SG5''A1 provided at the indicating portion in FIG. 9(a) are the electrodes constituting the segment electrode means, while KS1''A1, KS1''A2, KS2''A1, KS2''A2, KS2''A3, KS3''A1, KS3''A2, KS4''A1 and KS4''A2 in FIG. 9(b) are the electrodes constituting the common electrode. Further, the base plates shown in FIGS. 9(a) and 9(b) are mutually positioned by means of the positioning marks and then assembled as is shown in FIG. 7. Further, the members in FIGS. 9(a) and 9(b) having the same figures as those in FIGS. 5 and 6 are the same members, and therefore, their explanations are here omitted.

FIG. 8(a) shows the circuit diagram of the speed light device for the camera system shown in FIG. 2 and the light measuring circuit, the calculation circuit in the camera body. In the drawing, 71 is the operational amplifier constituting the SPC head amplifier, 72 is the photo-voltaic element (SPC) connected between the both input terminals of the above operational amplifier, and 73 is the logarithmically compressing diode inserted in the feed back circuit of the operational amplifier 71. 80 is the operational amplifier constituting an adder, whose inverting input terminal is connected to the output of the above operational amplifier 71 through the resistor and whose non-inversing input terminal is connected to the variable resistor 79 for presetting the shutter time information. 74 is the variable resistor for setting the ASA film sensitivity information and 76 is the negative feed back resistor. 81 is the inversing operational amplifier, whose inversing input terminal is connected to the output of the above operational amplifier 80 through the resistor. 78 is the feed back resistor of the above operational amplifier 81. 104 is the change-over switch in operative engagement with the manual setting switch 84 to be explained later, being connected to the side a in case of the automatic mode and to the side b in case of the manual mode. 103 is the variable resistor for setting the aperture value information in case of the manual mode.

81' is the variable resistor in operative engagement with the above variable resistor 79, the potential at whose intermediate tap goes up along as the preset shutter time becomes shorter. 82 and 83 are the voltage dividing resistors, so designed that a voltage corresponding to the fixed time (for example 1/60 sec.) for the flash light photography is produced at the voltage dividing point.

90 is the power source battery for the speed light device, 91 is the main switch for the speed light circuit, 92 is the voltage step-up DC-DC converter, 93 is the main condenser, 94 and 95 are the resistors for dividing the voltage between the both terminals of the above main condenser 93, 96 is the flash light discharge tube, 97 is the current limiting circuit for controlling the current running through the discharge tube 96, 98 is the computer circuit for adjusting the flash light, 99 is the photo-voltaic element (SPC) for computer adjusting the flash light and 100 is the one shot multivibrator, whose output terminal delivers the flash light adjustment confirmation signal. 101 is the operational amplifier constituting the comparison circuit for producing a charge completion signal, whose non-inversing input terminal is connected to the voltage dividing point of the voltage dividing resistors 94 and 95. Further, to the inversing input terminal the standard voltage Vs is applied. T1-T4 are the connecting terminals at the side of the camera body, while T1'-T4' are those at the side of the speed light device, whereby the terminal T1 is connected to that T1', T2 to T2', T3 to T3' and T4 to T4' when the speed light device is mounted on the camera body.

ASW31-ASW34 are the analogue switches consisting of field effective transistors (hereinafter called FET) and so on, whereby the input terminal of the ASW31 is connected to the above change-over switch 104, while the control input terminal is connected to the output of the inversing circuit IN31. Hereby, the input of the above inversing circuit IN31 is connected to the output of the above operational amplifier 101 through the connecting terminals T1-T1'. The input of the analogue switch ASW32 is connected to the output of the aperture information signal producing circuit 102 at the side of the speed light device through the connecting terminals T2-T2'. Further, to the control terminal the above charge completion signal is applied through the connecting terminals T1-T1'. Further, the input terminal of the analogue switch ASW33 is connected to the intermediary tap of the above variable resistor 81 so as to be supplied with the present shutter time information signal of the camera. The control input terminal is connected to the output of the above operational amplifier 101 for producing the charge completion signal through the inversing circuit IN32 and the connecting terminals T1-T1'. On the other hand, the input terminal of the analogue switch ASW34 is connected to the voltage dividing point of the above voltage dividing resistors 82 and 83 so as to be supplied with the fixed time signal (1/60 sec.) for the flash light photography. 85 is the operational amplifier constituting the comparison circuit for telling the higher range from the lower range of the shutter time information, whose non-inversing input terminal is connected to the output of the above analogue switches ASW33 and ASW34. Further, to the inversing input terminal the standard voltage Vs' is applied. IN33 is the inversing circuit, whose input terminal is connected to the output of the above operational amplifier 85. 84 is the normally opened switch for setting the manual mode, which is closed in the manual mode.

OR31 is the 4 input OR gate, whose input terminals are connected respectively to the lower terminal of the above switch 84, the output terminal of the operational amplifier 85 and the connecting terminals T1 and T3. OR32 is the 2 input OR gate, whose one input terminal is connected to the lower terminal and whose other input terminal is connected to the output of the above inversing circuit IN33. X is the X contact at the side of the camera, so designed as to close when the shutter is totally opened in case of the focal plane shutter.

Now, let us call the output time of the OR gate OR32 A4, that of the analogue switches ASW31 and ASW32 Av, that of the operational amplifier 85, A3, that starting from the connecting terminal T1, A1, that starting from the connecting terminal T3, A2, that of the OR gate OR31, B1 and that of the inverting circuit IN33, B2.

FIG. 8(b) shows the driving circuit of the liquid crystal cell for the camera system in FIG. 2. In the drawing, 110' is the 4 bit output A/D converter, and 110 is the decoder circuit, which converts the input analogue Av in FIG. 8(a) into a 12 bit decimal code. PG is the pulse producing circuit consisting of an inversing circuit, whose output is connected to the frequency dividing circuit BN consisting of several steps of flip-flop circuits, to whose output the inversing circuit IN45 is connected. FIG. 10 shows the wave forms of the output pulse (clock) of the pulse producing circuit PG, the output (T) of the frequency dividing circuit BN and the inversed output (T'). OR41-OR44 are the 3 input OR gates, whereby the three input terminals of the OR gate OR41 are connected respectively to the output terminals S1-S3 of the decoder 110, the three input terminals of the OR gate OR42 to the output terminals S4-S6 of the decoder 110, the three input terminals of the OR gate OR43 to the output terminals S7-S9 and the three input terminals of OR44 to the output terminals S10-S12. OR51-OR53 are the 4 input OR gates, whereby the four input terminals of the OR gate OR51 are connected respectively to the outputs S1, S6, S7 and S12 of the above decoder 110, the four input terminals of the OR gate OR52 respectively to the outputs S2, S5, S8 and S11 of the decoder 110 and the four input terminals of the OR gate OR53 respectively to the outputs S3, S4, S9 and S10. AN11-AN14 are the 2 input AND gates, whereby the one input of each gate is connected respectively to the output of the above OR gates OR41-OR44, while the other input terminal is all connected to the output of the frequency dividing circuit BN.

AN21-AN24 are the 2 input AND gates, whereby the one input is connected respectively to the output lines A1-A4 in FIG. 8(a), while to the other input the output pulse T̄ of the inversing circuit IN45 is all applied. IN11-IN14 are the inversing circuits connected to the outputs of the above AND gates AN21-AN24. ASW41-ASW48 are the analogue switches consisting of FET and the like, whereby the control inputs of the analogue switches ASW42, ASW44, ASW46 and ASW48 are connected respectively to the outputs of the above AND gates AN11-AN14 and AN24-AN21. Further, the control input terminals of the analogue switches ASW41, ASW43, ASW45 and ASW47 are connected respectively to the outputs of the above inversing circuits IN11–IN14. AN31–AN35 are the 2 input AND gates, whereby the one input terminal of each AND gates AN31–AN33 is connected respectively to the outputs of the above OR gates OR51–OR53, while to the other input terminal the above pulse signal T is applied. Further, the one input terminal of the AND gates, AN34–AN35 is respectively connected to the line B1 and B2 shown in FIG. 8(a), while to the other input terminal the above pulse signal $\overline{T}$ is applied. NA31–NA35 are the 2 input NAND gates, whereby the one input terminal of the NAND gates NA31–NA33 is respectively connected to the output of the above OR gates OR51–OR53, while to the other input terminal the pulse signal T is all applied. Further, the one input terminal of the NAND gates NA34–NA35 is connected respectively to the line B1 and B2, while to the other input terminal the pulse signal $\overline{T}$ is applied.

ASW51–ASW60 are the analogue switches consisting of FET or the like, whereby the control input of the analogue switches ASW51, ASW53, ASW55, ASW57 and ASW59 is connected respectively to the output of the above AND gates AN31–AN35, while the control input of the analogue switches ASW52, ASW54, ASW56, ASW58 and ASW60 is connected respectively to the output of the above NAND gates NA31–NA35. B is the liquid crystal driving wave form producing circuit, whereby the pulse voltages exist on the output lines L1–L4. Hereby, the output line L1 is connected to the input terminal of the above analogue switches ASW52, ASW54, ASW56, ASW58 and ASW60 and the output line L2 to the input terminal of the analogue switches ASW51, ASW53, ASW55, ASW57 and ASW59. Further, the output line L3 is connected to the input terminal of the analogue switches ASW41, ASW43, ASW45 and ASW47 and the output line L4 to the input terminal of the analogue switches ASW42, ASW44, ASW46 and ASW48.

Further, the outputs of the analogue switches ASW51 and ASW52 are connected to the segment electrodes SG1″ of the liquid crystal cell shown in FIG. 9(a). In the same way, the outputs of the analogue switches ASW53 and ASW54 are connected to the segment electrode SG2″ shown in FIG. 9(a), the outputs of the analogue switches ASW55 and ASW56 to the segment electrode SG3″ shown in FIG. 9(a), the outputs of the analogue switches ASW57 and ASW58 to the segment electrode SG4″ shown in FIG. 9(a) and the outputs of the analogue switches ASW59 and ASW60 to the segment electrode SG5″ shown in FIG. 9(a).

On the other hand, the outputs of the analogue switches ASW41 and ASW42 are connected to the input terminal of the common electrode KS1″ of the liquid cell shown in FIG. 9(b). In the same way, the outputs of the analogue switches ASW43 and ASW44 are connected to the common electrode KS2″ shown in FIG. 9(b), the outputs of the analogue switches ASW45 and ASW46 are connected to the common electrode KS3″ shown in FIG. 9(b) and the outputs of the analogue switches ASW47 and ASW48 to the common electrode KS4″ shown in FIG. 9(b).

FIG. 11 shows the construction of the electrodes of the liquid crystal used for the present embodiment in a way of matrix. The figures, the numerical figures and so on at the crossing points of the matrix represent the contents of the lights which light up at the crossing points. The numerical figures 1–22 represent the aperture values to be controlled, ↓ the under-exposure, ↑ the over-exposure, ∕ the speed light charge completion, OK the speed light computer adjustment confirmation, M the manual mode and HS the lower range of the preset shutter time.

Below, the operation of the circuit shown in FIG. 8(a) will be explained.

Now, let us consider the case the speed light device is not mounted or the main capacitor has not yet been fully charged, while the mode is automatic. In this state, the potential at the voltage dividing point of the voltage dividing resistors 94 and 95 of the speed light circuit is low, so that the level at the non-inversing input terminal is low than that at the inversing input terminal of the operational amplifier 101, which then produces the L level. Consequently, the level of the outputs of the inversing circuits IN31 and IN32 is H. Further, because the mode is automatic, the change-over switch 104 is connected to the side a. At the output of the light measurement calculation circuit A the analogue voltage corresponding to the aperture value to be controlled exists. Because to the control input of the analogue switch ASW31 the H level signal of the above inversing circuit IN31 is applied, the analogue switch ASW31 is closed, while because to the control input of the analogue switch ASW32 the L level signal of the operational amplifier 101 is applied the analogue switch ASW32 is opened. Thus, to the output line Av the output analogue voltage of the light measurement calculation circuit A is transmitted.

In the same way, because to the control inputs of the analogue switches ASW33 and ASW34 the H level signal and the L level signal are respectively applied, the analogue switch ASW33 closes, while the switch ASW34 opens. Thus, to the non-inversing input terminal of the operational amplifier in the next step the analogue voltage corresponding to the shutter time information preset on the above variable resistor 81′. In case now the preset shutter time is short, the level at the non-inversing input terminal of the operational amplifier 85 is higher than the level at the inversing input terminal, so that the output is H level. Hereby, the output of the inversing circuit IN33 is L level.

Further, because the mode is automatic, the above switch 84 is opened, while the level at the lower end of the switch 84 is L.

Further, because the main capacitor 93 of the speed light device has not yet charged, while the shutter has not yet released, the level of the output of the above one shot multivibrator 100 is L. Because as is clear from the above, the level of the two inputs of the OR gate OR32 is L, the level of the output line A4 is L. Further, to the output line Av the analogue output signal of the light measurement calculation circuit A is transmitted. The level of the output line A3 is H, while that of the output lines A1 and A2 is L. Further, because the level of the one input of the OR gate OR31 is H, the level of the output line B1 is H, while the level of the output line B2 is L.

Below, the operation of the circuit shown in FIG. 8(b) will be explained. The analogue signal of the above Av line is input in the A/D converter 110′ so as to be converted into the 4 bit binary code, whereby the level of the output of the decoder 110 corresponding to the binary code is selectively H. Now let us suppose that the output S7 is selected to be H level, while other outputs remain L level. Because in this case, the one input of the OR gates OR43 and OR5 is H level, the level of the output is H, while the level of the outputs of other OR gates OR41, OR42, OR44, OR52 and OR53 is L. Further, because the level of the output lines A3 and B1 is H, at the output of the AND gate AN13, the inversing circuit IN13, the AND gate AN31 and the NAND gate NA34 the pulse T as is shown in FIG. 10 appears. On the other hand, at the output of the inversing IN12, the AND gate AN23, the NAND gate NA31 and the AND gate AN34 the pulse $\overline{T}$ as is shown in FIG. 10 appears. Further, the output of the inversing circuits IN11 and IN14 is H level, that of the NAND gates NA32, NA33 and NA35 are H level and that of the AND gates AN32, AN33 and AN35 are L level. Now, let us consider the wave forms of the voltages to be applied to the segment electrodes SG1"–SG5" and the common electrodes KS1"–KS4".

Because the analogue switches ASW51 and ASW52 are alternatively closed by means of the pulse T and $\overline{T}$, in the segment electrode SG1" the wave form shown in FIG. 12(a) is produced. Further, because the analogue switches ASW53, ASW55 and ASW59 are opened, while ASW54, ASW56 and ASW60 are closed, the wave form as is shown in FIG. 12(a) is produced in the segment electrodes SG2", SG3" and SG5". Further, the analogue switches ASW57 and ASW58 are alternatively closed by means of the pulses T and $\overline{T}$, the wave form as is shown in the drawing is produced in the segment electrode SG4".

FIG. 12(b) shows the wave forms of the voltages applied to the common electrodes KS1"–KS4". Because the analogue switches ASW41 and ASW47 are closed, while ASW42 and ASW48 are opened, the voltage wave forms shown in FIG. 12(b) and existing on the above line L3 is applied to the common electrodes KS1" and KS4". Because the analogue switches ASW43 and ASW44 is closed alternatively by means of the above pulses T and $\overline{T}$, the voltage form as is shown in FIG. 12(b) is applied to the common electrode KS2". Because the analogue switches ASW45 and ASW46 are alternatively closed by means of the above pulses T and $\overline{T}$, the voltage wave form as is shown in the drawing is applied.

FIG. 12(c) shows the wave forms of the voltage applied between the respective segment electrodes SG1"–SG4" and the common electrodes KS1"–KS4" in this state. As is clear from the drawing, to the liquid crystal between the segment electrode SG1" and the common electrode KS2" a rectangular alternating voltage of 2V1 in P-P value is applied during the time interval T1 and a rectangular alternating voltage of ($\frac{1}{3}$)×2V1 in P-P value during the time interval T2. On the other hand to the liquid crystal between the segment electrode SG4" and the common electrode KS3" a rectangular alternating voltage ($\frac{1}{3}$)×2V1 in P-P value is applied during the time interval T1 and a rectangular alternating voltage 2V1 in P-P value during the time interval T2.

On the other hand, between other electrodes, as is clear from FIG. 12(c), a rectangular alternating current ($\frac{1}{3}$)×2V1 in P-P value is applied during the whole time. In case now V1 is adjusted in such a manner that the threshold voltage of the liquid crystal lies between the effective voltage with the wave form (SG4"–KS3") and that of the wave form (SG4"–KS2"), only the liquid crystal in the portion (SG4"–KS3") and that in the position (SG1"–KS2") are brought in the switched on state, while others remain in the switched off state. Thus, when the above is observed in the view finder, as can be understood from the matrix shown in FIG. 11, HS (the shutter time in higher range) and the aperture value of 4 are indicated. FIG. 14 shows the indication in the finder at this stage.

Below, the operation of the above circuit when the mode is automatic, while the main capacitor of the speed light device has been charged will be explained. Because in this case, the voltage at the voltage dividing point of the resistors 94 and 95 goes up, the output of the operational amplifier 101 is inversed into H level. Thus, the output of the inversing circuits IN31 and IN32 is inversed into L level, whereby the analogue switches ASW32 and ASW34 are closed, while ASW32 and ASW33 are opened. Thus, on the Av line, the output voltage of the aperture information producing circuit 102 at the side of the speed light device exists. Further, to the non-inversing input terminal of the operational amplifier 85 the voltage divided by means of the resistors 82 and 83 for producing the fixed shutter time is applied. Because the fixed shutter time (1/60 sec.) for the flash light photography lies in the higher shutter time range, the level of the output of the operational amplifier 85 is H, while that of the output of the inversing circuit IN33 is L. Further, because the mode is automatic, the switch 84 is opened, whereby the level at the lower end is L.

Because in the above state, the two inputs of the OR gate OR32 is L level, the output line A4 is on L level, the output line A3 on H level, the output line A1 on H level and the output line A2 on L level, while because the two inputs out of the four inputs of the OR gate OR31 is H level, the output line B1 is on H level, and the output line B2 on L level. Further, on the Av line the aperture value signal voltage from the aperture value information producing circuit 102 at the side of the speed light device exists. Now let us suppose that the aperture value signal corresponds to F5–6, while the output S6 of the decoder 110 is selectively H level. At this time, the output of the OR gates OR42 and OR51 is H level, while the output of other OR gates is L level. Thus, in this state at the output of the AND gate AN12 the above pulse T exists, while at the output of the AND gates AN21 and AN23 the pulse $\overline{T}$ exists, whereby the output of other AND gates is L level. Thus, to the control input of the analogue switch ASW41 the pulse T is applied and to the control input of the analogue switch ASW42 the pulse $\overline{T}$. Further, to the control input of the analogue switches ASW43, ASW46 and ASW47 the H level signal is applied and to the control input of the analogue switches ASW44, ASW45 and ASW48 the L level signal is applied.

On the other hand, to the control input of the analogue switches ASW51 and ASW58 the pulse T is input and to the control input of the analogue switches ASW52 and ASW57 the pulse $\overline{T}$ is input. Further, to the control input of the analogue switches ASW54, ASW56 and ASW60 the H level signal is input and to the control input of ASW53, ASW55 and ASW59 the L level signal is input. FIG. 13(a) shows the wave forms of the voltages produced in the respective segment electrodes SG1"–SG5". FIG. 13(b) shows the wave forms of the voltages produced in the respective common electrodes KS1"–KS4". FIG. 13(c) shows the wave forms of the voltages applied to the liquid crystal between the segment electrodes and the common electrodes. As is clear from the drawings, the liquid crystal between the segment electrode SG1" and the common electrode KS3", that between the segment electrode SG4" and the common electrode KS1" and that between the segment electrode SG4" and the common electrode KS3" are brought in the switched on state. Thus, as can be understood from the matrix shown in FIG. 11, the aperture value 5-6, the charge completion and the higher shutter time range HS are indicated. Further, when the emission of the flash light has been adjusted by the computer, the one shot multivibrator 100 produces a pulse voltage with a certain determined width, whereby the output line A2 remains on H level for a certain determined time interval so as to indicate the computer flash light adjustment confirmation OK for a certain determined time interval.

Below, the operation of the circuit shown in FIG. 8 when the mode is automatic will be explained. At this time, as has already been explained, the switch 84 is closed, while the change-over switch 104 is connected to the side b. Thus, the output line A4 is on H level, so that the manual mode M is indicated, while on the Av line the manually set aperture value information signal from the variable resistor 103, so as to indicate the manually set aperture value.

Below, other embodiments of the present invention will be explained in accordance with the accompanying drawings. FIGS. 15, 16 and 17 show the construction of the electrode base plate of other embodiments of the indicating device in accordance with the present invention. In case of the embodiment of the present invention shown in FIGS. 9(a) and 9(b), in order to make the space 1 of the base plate between the liquid crystal indicating portion and the view finder frame small the electrode forming the short-circuiting means for connecting the various patterns forming the indicating portion is made into only one line-shaped pattern in the above space 1, while other short-circuiting electrodes are arranged on the base plate on the other side of the above space 1 with reference to the indicating portion in the electrode base plate planes 60 and 61. Further, the connection between the both base plates is carried out by means of the conductive portion in such a manner that the liquid crystal indicating portion can be arranged as close to the view field frame of the view finder as possible. Various construction of the patterns according to the above method can be thought out, whereby the embodiment of the present invention to be explained below is also constructed in accordance with the above purpose.

FIG. 15 shows another embodiment of the segment base plate shown in FIG. 9(a), whereby the short-circuiting electrodes for the signal electrodes SG2", SG1" and SG4" are arranged outside of the base plate so as to make the size of the base plate small. Other patterns on the base plate are same as is shown in FIG. 9(a), so that their explanations are omitted here. The short-circuiting electrodes shown with a, b and c in the drawing are replaced for example with the flexible printed circuit plate 16' shown in FIG. 16. The short-circuiting electrodes a', b' and c' shown in FIG. 16 are made conductive with the electrode base plate shown in FIG. 15 by means of the connecting conductive rubber 19 as is shown in FIG. 4 in such a manner that the connecting electrodes a, b and c in the drawing are respectively connected therewith so as to realize the same construction as that of the electrode base plate shown in FIG. 9(a), whereby an equivalent efficiency can be obtained, while the base plate can be made small.

The patterns shown in FIG. 17 can be used instead of the connecting portion shown in FIG. 16. When the patterns are used for the base plate shown in FIG. 15, the size of the base plate can be made small. The upper patterns in FIG. 17 are respectively connected to the signal input terminals shown in FIG. 15, while some of these connecting members are connected to each other by means of the short-circuiting electrodes a", b" and c", as is shown in the drawing, so that an equivalent base plate to the electrode base plate shown in FIG. 9(a) can be obtained.

Figure 18:
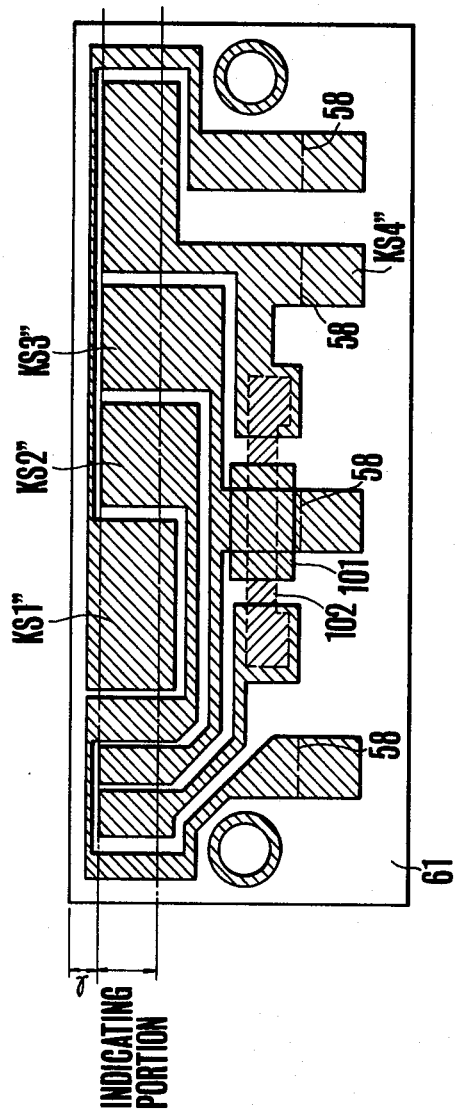
Figure 18:
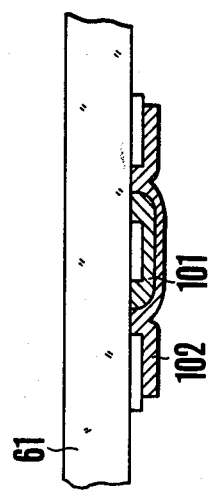

FIG. 18 shows the third embodiment of the indicating device in accordance with the present invention, whereby the construction of the base plate is same as that of the electrode base plate 61 shown in FIG. 9(b). The difference is that in FIG. 18 on the same electrode base plate a part of the short-circuiting electrodes are arranged overlapped, making use of an insulation layer. In FIG. 9(b) the signal electrode KS4" arranged on the base plate is connected through the short-circuiting electrode 61CC arranged at the lower part of the drawing so that it is inconvenient for making the base plate small. In case of the embodiment shown in FIG. 18, KS4" is overlapped on KS3" through the insulation layer so as to make the base plate small. Namely, as is shown in section in FIG. 18(b), after respective electrode patterns have been formed on the base plate, the insulation layer 101 is formed on a part of the patterns and then the short-circuiting electrode 102 is formed on the insulation layer by means of metallization or printing. The base plate obtained in this way is quite equivalent to that shown in FIG. 9(b), whereby by combining this with the base plate shown in FIG. 15, the indicating device can be made compact.

FIG. 19(a) and FIG. 19(b) show the construction of the base plate of further another embodiment of the indicating device in accordance with the present invention. In this embodiment the shape of the patterns the indicating portion of the segment base plate 60 is same, while the shape of the patterns of the indicating portion of the common electrode base plate 61 is also same. These patterns of the indicating portions are led to the signal input terminals arranged at the one side of the one base plate 61 in combination with the wiring patterns shown in the drawing and the conductive patterns between the upper and the lower base plates. The wiring patterns and the conductive patterns on the segment base plate 60 shown in FIG. 19(a) are symmetrical so that when the common electrode base plate 61 shown in FIG. 19(b) is laid over the above the circuits on both of the base plates are made conductive to each other by means of the conductive materials between the respective conductive portions, while other portions are insulated by means of the insulation layer so as to constitute an indicating device. As is shown in the drawing, in case of the present embodiment there is no wiring pattern at all on the base plate plane between the indicating patterns and the view finder frame so that the information indicating portion and the liquid crystal indicating patterns can be arranged close to each other in the view finder. Hereby, the driving circuit for the indicating device shown in FIG. 19 can easily constructed out of the circuit shown in FIG. 8.

So far various embodiments of the present invention have been explained in detail in accordance with the accompanying drawings, whereby in case of the liquid crystal indicating device in accordance with the present invention, the space of the base plate of the indicating portion at the side of the view field frame of the view finder can be made remarkably small so that as the indicating device in the view finder of the camera the quite effective liquid crystal indication can be realized. Further, the above embodiments shown in the drawings are nothing but examples and it goes without saying that other various variations are possible.

What is claimed is:

1. For a camera, a liquid crystal indication device having a display portion, comprising:
    (A) camera display signal producing means for producing display signals representative of camera data and having a plurality of output terminals;
    (B) a first electrode base plate;
    (C) common electrode means on the first electrode base plate for forming the display portion to display the display signals from said display signal producing means, the common electrode means having a plurality of electrodes;
    (D) a second electrode base plate;
    (E) segment electrode means along a side of the second electrode base plate for forming said display portion to display the display signals from said display signal producing means, the segment electrode means including a plurality of electrodes, a plurality of said electrodes being related electrodes;
    (F) short circuit means for mutually connecting said related electrodes of the segment electrode means in such a manner that said display signal is applied simultaneously to the related electrodes of the segment electrode means the short circuit means being located on a portion of the second electrode base plate;
    (G) first connecting means connected between said display signal producing means and said common electrode means for transmitting the display signals to the common electrode means; and
    (H) second connecting means for transmitting the display signal from said display signal producing means to the segment electrode means, and connected between each of the electrodes of said segment electrode means grouped by the short circuit means and the output terminal of said display signal producing means corresponding to each of the grouped electrodes;
    (I) said short circuit means being located on the side of the second connecting means opposite the display portion.

2. A liquid crystal display apparatus of the matrix driving type having a display portion for a camera comprising:
    (A) means for producing display signals representative of camera data and having a plurality of output terminals;
    (B) a first electrode base plate;
    (C) common electrode means on the first electrode base plate for forming part of a display portion and to display the display signals from said display signal producing means, a second electrode base plate, segment electrode means located along a side of the second electrode base plate for forming part of the display portion and including a plurality of groups of related electrodes; and
    (D) short circuit means for mutually connecting related electrodes of the segment electrode means in such a manner that said display signal is applied simultaneously to the related electrodes of the segment electrode means, said short circuit means located on a portion of the second electrode base plate;
    (E) first connecting means connected between said display signal producing means and said common electrode means for transmitting the display signals to the common electrode means; and
    (F) second connecting means for transmitting the display signals to the segment electrode means, and connected between each of the electrodes of said segment electrode means grouped by the short circuit means and an output terminal of said display signal producing means corresponding to each of the grouped electrodes;
    (G) said short circuit means being located on the side of the second connecting means opposite to the display portion.

3. A camera with a rectangular liquid crystal display apparatus having a display portion, comprising:
    (A) means for producing display signals representative of data for the camera, the display signal producing means having a plurality of output terminals;
    (B) a first electrode base plate;
    (C) common electrode means on the first electrode base plate and for forming said display portion to display the display signals from said display signal producing means, a second electrode base plate comprising:
        (C-1) segment electrode means along a side of the second electrode base plate for forming said display portion to display the display signals from said display signal producing means, the segment electrode means including a plurality of electrodes; and
        (C-2) short circuit means for mutually connecting the related electrodes of said segment electrode means in such a manner that said display signal is applied simultaneously to related electrodes of said segment electrode means, said short circuit means being provided on a second of said second electrode base plate;
    (D) first connecting means connected between said display signal producing means and said common electrode means for transmitting the display signals to the common electrode means; and
    (E) second connecting means for transmitting the display signals to the segment electrode means and connected between each of the electrodes of said segment electrode means grouped by the short circuit means and the output terminal of said display signal producing means corresponding to each of the grouped electrodes;
    (F) said short circuit means being located on the side of the second connecting means opposite the display portion.

4. A liquid crystal display apparatus according to claim 3, wherein
    said short circuit means consists of a detachable member.

5. A liquid crystal indicator for a camera, comprising:
    (A) camera display signal producing means for producing display signals representative of camera data;
    (B) a first electrode base plate;
    (C) a plurality of first electrodes on the first base plate and arranged for forming a display portion;
    (D) a second electrode base plate covering the first electrode base plate;

(E) a plurality of second electrodes mounted on the second base plate between the first base plate and the second base plate and opposite the electrodes of the first base plate;

(F) a liquid crystal between the first plurality of electrodes and the second plurality of electrodes;

(G) said first electrodes being divided into a plurality of groups and said second electrodes being divided into a plurality of groups in a pattern different from the plurality of groups in the first plurality of electrodes facing the second plurality of electrodes;

(H) a plurality of connecting lines, each connecting the electrodes of a different one of the groups;

(I) said connecting lines being mounted on said first base plate;

(J) a second plurality of connecting lines on the second base plate, each connecting electrodes within a group;

(K) insulating means insulating the connecting lines of said first base plate from the connecting lines of said second base plate;

(L) said base plates each having edges each facing an edge of the other base plate;

(M) said first and said second plurality of electrodes being aligned close to edges near each other on the first and second base plates;

(N) said connecting lines on each base plate being mounted on the base plate at locations more remote than the first and second plurality of electrodes from the edges near the first and second plurality of electrodes;

(O) a plurality of input terminals on each of said base plates for receiving input signal;

(P) said connecting lines on each of said base plates being located on the side of the plurality of input terminals opposite the plurality of electrodes on a corresponding one of the base plates.

* * * * *